Oct. 20, 1959   W. W. JUKKOLA   2,909,424
METHOD AND DEVICE FOR TRANSFERRING FLUIDIZED SOLIDS
Filed June 4, 1957
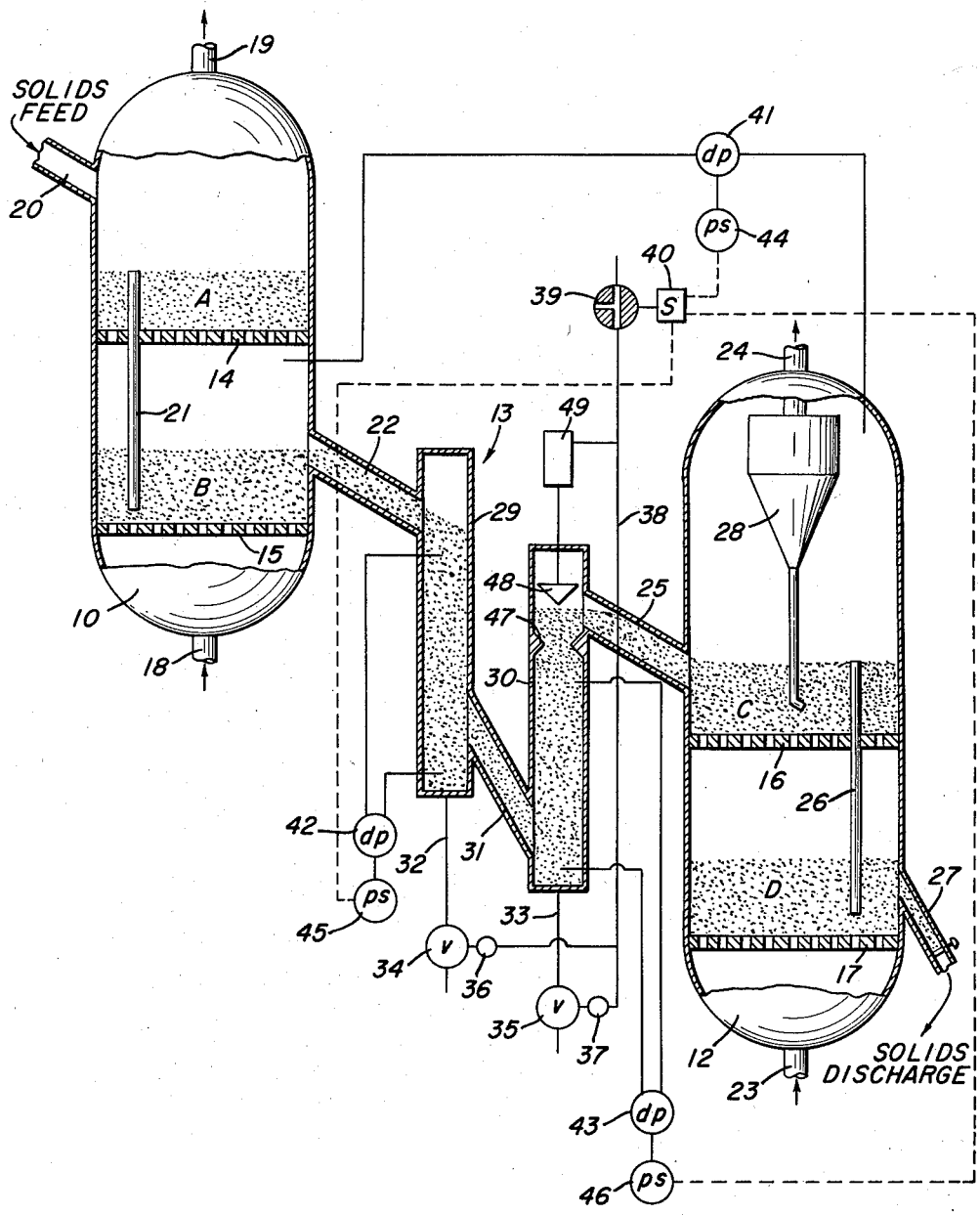
INVENTOR
WALFRED W. JUKKOLA
By: Donald G. Dalton
Attorney.

United States Patent Office 2,909,424
Patented Oct. 20, 1959

2,909,424
METHOD AND DEVICE FOR TRANSFERRING FLUIDIZED SOLIDS

Walfred W. Jukkola, Westport, Conn., assignor, by mesne assignments, to United States Steel Corporation, Pittsburgh, Pa., a corporation of New Jersey Application June 4, 1957, Serial No. 663,516

9 Claims. (Cl. 75—26)

This invention relates to an improved method and device for continuously transferring fluidized solids between two chambers while preventing intermixing of gases from these chambers.

The invention is especially applicable to a continuous direct reduction process for iron ore for transferring ore fines from a preheating chamber to a reducing chamber. In the preheating chamber the fines are heated to a temperature commonly in the range 1600 to 1750° F. by burning a fuel. The products of combustion serve also as a fluidizing gas and are oxidizing in character. In the reducing chamber the preheated fines are fluidized and reduced by treatment with a preheated reducing gas, such as hydrogen, carbon monoxides or mixtures thereof. For safety, as well as process reasons, it is essential to avoid intermixing of gases from the two chambers. Nevertheless it is apparent my invention is not limited to this particular operation, but is applicable wherever similar problems are encountered.

An object of the present invention is to provide an improved method and device for transferring fluidized solids between two chambers in which a U-tube seal prevents intermixing of gases from the two chambers, and solids within the U-tube are maintained in a fluidized state by admitting a gas compatible with the gases in both chambers. By a "compatible gas" I means a gas which can mix with either of the other gases without detrimental effect.

A further object is to provide a method and device which afford the foregoing advantages and also enable one or both chambers to operate with back pressure applied thereto.

A further object is to provide a solids transfer device equipped with pressure-operated positive shut-off means for automatically stopping flow whenever there is a failure, such as a pressure upset or lack of material.

In accomplishing these and other objects of the invention, I have provided improved details of structure, a preferred form of which is shown in the accompanying drawing, in which the single figure is a schematic vertical section of a pair of chambers connected by a solids transfer device embodying my invention.

The drawing shows first and second conventional chambers 10 and 12 adapted to contain fluidized beds of finely divided solids and a transfer device 13 constructed in accordance with my invention for transferring solids from chamber 10 to chamber 12. Chamber 10 contains upper and lower beds A and B supported on horizontal perforate partitions 14 and 15. Similarly chamber 12 contains beds C and D supported on partitions 16 and 17. Nevertheless my transfer device can be used equally well if one or both chambers contains a greater number of beds or only a single bed. Chamber 10 has a gas inlet 18 at its lower end, a gas outlet 19 at its upper end, a solids feeder 20 above its upper partition 16, an overflow pipe 21 connecting beds A and B, and a solids discharge 22 above its lower partition 15. Likewise chamber 12 has a gas inlet 23, gas outlet 24, solids feeder 25, overflow pipe 26 and solids discharge 27, all similarly arranged. Preferably one or both gas outlets are equipped with cyclone dust catchers 28, illustrated only on the outlet 24 from chamber 12.

Finely divided solids feed via the feeder 20 to the upper bed A in chamber 10, overflow from bed A via the pipe 21 to bed B, and discharge from bed B via the discharge 22 into my transfer device 13. After passing through my transfer device, these solids feed via the feeder 25 to the upper bed C in chamber 12, overflow from bed C via the pipe 26 to bed D, and discharge from bed D via the discharge 27 for further processing. Fluidizing gas is introduced to the respective chambers 10 and 12 via the inlets 18 and 23, flows upwardly through the partitions and beds counter to the solids flow, and leaves via the outlets 19 and 24.

My transfer device 13 comprises first and second vertical standpipes 29 and 30 and a downwardly sloping connecting pipe 31 joined to the lower portions of said standpipes. The discharge 22 from chamber 10 enters the upper portion of standpipe 29; the feeder 25 to chamber 12 discharges from the upper portion of standpipe 30. Gas inlet pipes 32 and 33 are connected to the lower ends of standpipes 29 and 30 respectively. A gas compatible with the gases in both chambers 10 and 12 is introduced via these inlet pipes to the respective standpipes, where it maintains solids therein in a fluidized state. Conventional devices not shown can be used to regulate flow of this gas to provide proper fluidization. Such gas discharges from the upper portions of the standpipes via the solids discharge 22 into chamber 10 and via the solids feeder 25 into chamber 12. The standpipes 29 and 30 and connecting pipe 31 form a U-tube. Preferably the system is operated with the freeboard above bed B in chamber 10 at the same pressure as the freeboard above bed C in chamber 12. Consequently the columns of fluidized solids in the standpipes 29 and 30, which form the arms of the U-tube, are subjected to equal pressures. The column heights are sufficient to seal the chambers against escape of gas into either standpipe, despite any pressure differential which may arise and despite any positive back pressure which might be applied to one of the chambers. Solids of course flow freely from chamber 10, down its discharge 22, standpipe 29 and connecting pipe 31, up standpipe 30 and down feeder 25 into chamber 12.

As a safety feature, I prefer to equip the transfer device with positive means for automatically stopping flow therethrough in the event of a pressure upset, even though the column heights alone are sufficient to stop flow. A static bed of solids is less pervious to flow of gases than a fluidized bed. Therefore I first discontinue admission of fluidizing gases into the standpipes 29 and 30. For this purpose the gas inlet pipes 32 and 33 contain shut-off valves 34 and 35, which have pressure controlled operating devices 36 and 37. A line 38 connects these operating devices to a source of compressed air. Line 38 contains a 3-way valve 39 which has an operating solenoid 40. A first differential pressure device 41 is connected to the freeboard above bed B in chamber 10 and to the freeboard above bed C in chamber 12. A second differential pressure device 42 is connected to the upper and lower portions of standpipe 29. A third differential pressure device 43 is connected to the upper and lower portions of standpipe 30. The three differential pressure devices 41, 42 and 43 are connected to pressure switches 44, 45 and 46 respectively. Whenever the pressure device 41 indicates an appreciable pressure difference between the two freeboards or one of the pressure devices 42 or 43 indicates an abnormal pressure difference between the bottom and top of the columns in the respective standpipe, caused for example by a lack of material, one of the switches 44, 45 or 46 closes and completes a circuit to the solenoid 40. Thereupon the 3-way valve 39 shifts to close the air line 38 and exhaust the pressure from the valve operating devices 36 and 37, thus closing valves 34 and 35. Per se the valves and their operating devices, the differential pressure devices and the pressure switches are all well-known conventional items not of my invention. Therefore no detailed showing is deemed necessary.

As a further safety means, I prefer to close off the standpipe 30 when a pressure upset occurs. For this purpose, the standpipe contains a valve seat 47 below its connection with the solids feeder 25. A cooperating valve closure 48 is mounted for reciprocable movement in the standpipe and has a pressure-controlled operating device 49. The compressed air line 38 also is connected to the operating device 49 so that valve 47, 48 closes at the same time as valves 34 and 35.

In the example of iron ore reduction, chamber 10 can be a two-stage preheater, the solids fed thereto can be iron ore fines, and the gas a combustible mixture of fuel and excess air, oxidizing in character. Chamber 12 can be a two-stage reducer, the solids discharged therefrom can be sponge iron, and the gas introduced thereto can be a preheated reducing gas, such as hydrogen, carbon monoxide or mixtures thereof. After the reducing gas leaves the reducer, it is regenerated by removal of reaction products and re-used in the process. Hence it must not be contaminated with products of combustion from the preheater. The compatible gas introduced to the two standpipes can be steam. In standpipe 29 steam serves also to strip oxidizing products of combustion from the preheated ore fines. Since these products of combustion are useful only for recovery of their sensible heat, addition of steam is not detrimental, but contamination with spent reducing gas would be wasteful. Spent reducing gas already contains water vapor as a reaction product. Therefore steam introduced via the standpipe merely adds slightly to the water content subsequently removed when the gas is regenerated.

From the foregoing description, it is seen that my invention affords a simple device and method for continuously transferring fluidized solids between two chambers and preventing intermixing of the gases. The device also assures that flow through the system automatically stops in the event of failure.

While I have shown and described certain preferred embodiments of my invention, it is apparent that other modifications may arise. Therefore, I do not wish to be limited to the disclosure set forth but only by the scope of the appended claims.

I claim:

1. In a direct reduction process for iron ore wherein different fluidizing gases act on beds of ore fines successively in a preheating chamber and a reducing chamber, a method of continuously transferring ore fines from said preheating chamber to said reducing chamber comprising discharging fines from said preheating chamber to the top of a downwardly flowing column, discharging fines from the bottom of said downwardly flowing column to the bottom of an upwardly flowing column, discharging fines from the top of said upwardly flowing column to said reducing chamber, and introducing to the bottoms of both said columns a fluidizing gas distinct from the fluidizing gas in either of said chambers but compatible with the gases in both chambers, the fluidized solids in said columns preventing intermixing of gases from the preheating and reducing chambers.

2. In a direct reduction process for iron ore wherein oxidizing and reducing gases act on and fluidize beds of ore fines successively in a preheating chamber and a reducing chamber, a method of continuously transferring ore fines from said preheating chamber to said reducing chamber comprising discharging fines from said preheating chamber to the top of a downwardly flowing column, discharging fines from the bottom of said downwardly flowing column to the bottom of an upwardly flowing column, discharging fines from the top of said upwardly flowing column to said reducing chamber, introducing to the bottom of said downwardly flowing column a fluidizing gas distinct from but compatible with both the oxidizing and reducing gases and thereby stripping the fines of gas from the preheating chamber, and introducing to the bottom of said upwardly flowing column a fluidizing gas distinct from but compatible with both the oxidizing and reducing gases, said columns being of a height that the fluidized solids therein seal the chambers against escape of gases through the columns into the opposite chamber.

3. A method as defined in claim 2 in which said oxidizing gas consists of products of combustion of fuel in excess air, the reducing constituent of said reducing gas is selected from the group consisting of hydrogen, carbon monoxide and mixtures thereof, and said compatible gas is steam.

4. In an apparatus which includes a pair of chambers, means in said chambers for supporting fluidized beds of finely divided solids, means connected with said chambers for feeding solids to the beds and discharging solids therefrom, and gas inlet and outlet means at the bottoms and tops respectively of said chambers, the combination with said chambers of a device for transferring solids from one chamber to the other comprising a U-tube having arms connected respectively to the discharging means of the first chamber and to the feeding means of the other chamber, said arms being of a height that columns of fluidized solids therein seal the chambers against escape of gases through the U-tube to the opposite chamber, means for introducing to the bottoms of the arms of the U-tube fluidizing gas distinct from the fluidizing gas in either of said chambers but compatible with the gases in both chambers, and differential pressure means for shutting off fluidizing gas to said U-tube in the event of a pressure upset of predetermined magnitude to render the columns of solids therein static.

5. A combination as defined in claim 4 in which said differential pressure means is connected to respond to pressure differences between said chambers and between the bottom and top of the U-tube arms.

6. In an apparatus which includes a pair of chambers, means in said chambers for supporting fluidized beds of finely divided solids, means connected with said chambers for feeding solids to the beds and discharging solids therefrom, and gas inlet and outlet means at the bottoms and tops respectively of said chambers, the combination with said chambers of a device for transferring solids from one chamber to the other comprising a U-tube having arms connected respectively to the discharging means of the first chamber and to the feeding means of the other chamber, said arms being of a height that columns of fluidized solids therein seal the chambers against escape of gases through the U-tube to the opposite chamber, means for introducing to the bottoms of the arms of the U-tube fluidizing gas distinct from the fluidizing gas in either of said chambers but compatible with the gases in both chambers, valves for shutting off fluidizing gas to said U-tube, a valve for closing off said U-tube below its connection to the feeding means of the other chamber, and differential pressure means to close said valves in the event of a pressure upset of a predetermined magnitude.

7. A combination as defined to claim 6 in which said differential pressure means is connected to respond to pressure differences between said chambers and between the bottom and top of the U-tube arms.

8. In an apparatus for continuous direct reduction of iron ore fines, which apparatus includes a preheating chamber, a reducing chamber, means in said chambers for supporting fluidized beds of ore fines, means connected with said chambers for feeding fines to the beds and discharging fines therefrom, and inlet and outlet means at the bottoms and tops respectively of said chambers for passing oxidizing gas through the preheating chamber and reducing gas through the reducing chamber, the combination with said chambers of a device for transferring fines from said preheating chamber to said reducing chamber comprising a U-tube having arms connected respectively to the discharging means of said preheating chamber and to the feeding means of said reducing chamber, said arms being of a height that columns of fluidized fines therein seal the chambers against escape of gases through the U-tube to the opposite chamber, and means for introducing to the bottoms of the arms of the U-tube fluidizing gas distinct from the fluidizing gas in either of said chambers but compatible with the gases in both chambers.

9. In an apparatus for continuous direct reduction of iron ore fines, which apparatus includes a preheating chamber, a reducing chamber, means in said chambers for supporting fluidized beds of ore fines, means connected with said chambers for feeding fines to the beds and discharging fines therefrom, and inlet and outlet means at the bottoms and tops respectively of said chambers for passing oxidizing gas through the preheating chamber and reducing gas through the reducing chamber, the combination with said chambers of a device for transferring fines from said preheating chamber to said reducing chamber comprising a U-tube having arms connected respectively to the discharging means of said preheating chamber and to the feeding means of said reducing chamber, said arms being of a height that columns of fluidized fines therein seal the chambers against escape of gases through the U-tube to the opposite chamber, means for introducing to the bottoms of the arms of the U-tube fluidizing gas distinct from the fluidizing gas in either of said chambers but compatible with the gases in both chambers, and differential pressure means for shutting off fluidizing gas to said U-tube in the event of a pressure upset of a predetermined magnitude to render the columns of solids therein static.

References Cited in the file of this patent

UNITED STATES PATENTS

| | | |
|---|---|---|
| 2,425,807 | Jahnig | Aug. 19, 1947 |
| 2,464,812 | Johnson | Mar. 22, 1949 |
| 2,477,454 | Heath | July 26, 1949 |
| 2,481,226 | Krebs | Sept. 6, 1949 |
| 2,620,313 | Odell | Dec. 2, 1952 |
| 2,683,077 | Lewis | July 6, 1954 |
| 2,833,622 | Roberts et al. | May 6, 1958 |